United States Patent [19]
Yokoyama

[11] Patent Number: 5,568,567
[45] Date of Patent: Oct. 22, 1996

[54] TWO-DIMENSIONAL IMAGE PROCESSING METHOD AND APPARATUS FOR APPROXIMATING CIRCULAR ARC CONFIGURATION OF AN OBJECT

[75] Inventor: Haruhiko Yokoyama, Osaka, Japan

[73] Assignee: Matsushita Electric Industrial Co., Ltd., Osaka-fu, Japan

[21] Appl. No.: 824,173

[22] Filed: Jan. 22, 1992

[30] Foreign Application Priority Data

Jan. 22, 1991 [JP] Japan ................................ 3-005437

[51] Int. Cl.⁶ .................................................. G06K 9/46
[52] U.S. Cl. .......................... 382/204; 382/203; 382/241
[58] Field of Search ..................... 382/22, 25, 8, 382/203, 204, 241; 356/376, 384; 364/560

[56] References Cited

U.S. PATENT DOCUMENTS

| | | | |
|---|---|---|---|
| 4,288,852 | 9/1981 | Holland | 382/25 |
| 4,361,830 | 11/1982 | Honma et al. | 382/25 |
| 4,618,989 | 10/1986 | Tsukune et al. | 382/25 |
| 4,644,583 | 2/1987 | Watanabe et al. | 382/22 |
| 4,797,939 | 1/1989 | Hoki et al. | 382/8 |
| 4,914,601 | 4/1990 | Smyth | 364/560 |

*Primary Examiner*—Leo Boudreau
*Assistant Examiner*—Chris Kelley
*Attorney, Agent, or Firm*—Wenderoth, Lind & Ponack

[57] ABSTRACT

Two-dimensional image data of an object is processed to inspect a circular arc configuration of the object. Initially, the two-dimensional image data is subjected to a data extraction process in which image edge points of the circular arc configuration of the object are extracted from the two-dimensional image data. The image edge points are then applied to a process to approximate the circular arc configuration of the object by defining a circle which minimizes a mean value of a fourth power error of the image edge points relative to the circle, the thus defined circle being used to approximate the circular arc configuration of the object.

13 Claims, 4 Drawing Sheets

Fig. 2

| -1 | -1 | -1 |
|----|----|----|
| -1 | 8  | -1 |
| -1 | -1 | -1 |

Fig. 3
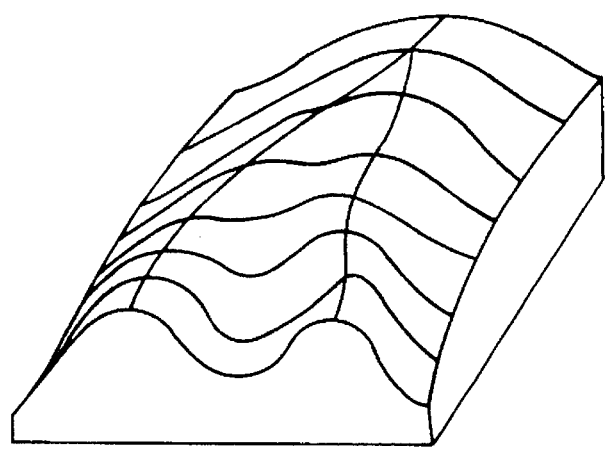
Fig. 4
| X3 | X2 | X1 |
|----|----|----|
| X4 | X  | X0 |
| X5 | X6 | X7 |
Fig. 5
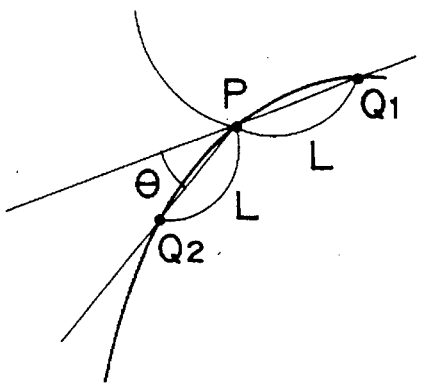

TWO-DIMENSIONAL IMAGE PROCESSING METHOD AND APPARATUS FOR APPROXIMATING CIRCULAR ARC CONFIGURATION OF AN OBJECT

BACKGROUND OF THE INVENTION

The present invention relates to a method and apparatus for measuring or inspecting a circular arc configuration of a product or part such as the circular arc configuration of a thread hole, and more particularly to a method for approximating the center position and radius of the circular arc configuration based on image information.

With reference to the drawings, two examples of conventional method for approximating a circular are configuration are is described below.

The conventional method includes the following three processes (A), (B) and (C).
Process (A):
A sequence of edge points is extracted from a two-dimensional image.
Process (B):
A point sequence is formed based on the edge points.
Process (C):
A circular-arc is approximated based on the point sequence. The circular-arc configuration of the product is detected according to the approximated circular arc.

The two examples 1 and 2 of conventional method which will be described below each include the above-described processes (A) and (B), but are different from each other with respect to process (C).

First, the process (A) for extracting edge points from the two-dimensional image is described. Normally, in measuring or inspecting the configuration of a specified portion of a product or part, there are abrupt changes in the density of the image thereof. The image density suddenly changes at the edge point. Therefore, the absolute value of the differentiated value of the image density is large at the edge point. Thus, the image is filtered by a differential filter so that a point at which the absolute value of the output is large is set as the edge point. A Laplacian filter is an example of a differential filter. FIG. 2 shows an example of an output, obtained by the use of the Laplacian filter, in which a center point having a value "8" is an edge point. In extracting ridges shown in FIG. 3 from a two-dimensional image, a result obtained by using the Laplacian filter is shown in FIG. 4. An edge point is required to satisfy two of the following four conditions.

$X \geq X_0$ and $X > X_4$
$X \geq X_1$ and $X > X_5$
$X \geq X_2$ and $X > X_6$
$X \geq X_3$ and $X > X_7$ The process (B) for forming a point sequence based on edge point is now described. In order to obtain a point sequence from the aggregation of edge points obtained in the process (A), adjacent edge points are connected with each other. In this case, short lines branching from the point sequence are deleted. Of long lines branching from the point sequence, only a point sequence consisting of a branch having a minimum curvature is selected and other branches are cut off to obtain a single point sequence having no branches. The curvature (C) is calculated as follows: A branch point shown in FIG. 5 is assumed as (P). Points spaced at a length (L) from the point (P) are supposed as $Q_1$ and $Q_2$. When the difference in the directional angle between a vector $Q_1P$ and a vector $PQ_2$ is supposed as θ, the curvature (C) is found as follows:

$$C = \theta/L \quad (1)$$

The value of (L) is set to be smaller than the radius of a circumference which must be detected so that noise does not have a large inappropriate influence on calculations used for finding the curvature (C) because it is sensitive that the value is set to be too small. The resulting point sequence is expressed as follows:

$$\{P_i | i=1, \ldots N\} \quad (2)$$

The process (C) for approximating a circular arc from the point sequence of the process (B) and detecting the circular arc configuration based on the approximated circular arc will now be described. Since the two examples 1 and 2 differ with respect to process (C), the example 1 is first described below. FIG. 6 is an illustration showing the method for calculating a partial curvature $C_{i+1}$ of the first example 1.

The partial curvature $C_{i+1}$ of a curve formed by three points $P_i$, $P_{i+1}$ and $P_{i+2}$ is expressed as follows:

$$C_{i+1} = \theta_{i+1}/d_{i+1} \quad (3)$$

where $\theta_{i+1}$ is the difference in the directional angle between a vector $(P_i\ P_{i+1})$ and a vector $(P_{i+1}\ P_{i+2})$, and $d_{i+1}$ is the average of the length $P_i\ P_{i+1}$ and the length $P_{i+1}\ P_{i+2}$.

The curvature $C_1$ of the entire point sequence is expressed as follows:

$$C_1 = \sum_{i=1}^{N-2} C_{i+1}/(N-2) \quad (4)$$

A decision is made according to the value of the variance of the partial curvature $C_{i+1}$ with respect to the curvature $C_1$ of the entire point sequence. If the variance value is smaller than a predetermined value, it is decided that the point sequence is a part of a circular arc and consequently, detected as the circular arc.

The process (C) of example 2 for approximating a circular arc from the point sequence of the process (B) and detecting the circular arc configuration based on the approximated circular arc will now be described. FIG. 7 is an illustration showing the method for calculating a partial curvature $C_{i+s}$ of the example 2.

According to the example 2, instead of calculating the partial curvature of a curve configured by the three continuous points as in the example 1, the partial curvature $C_{i+s}$ between two points spaced at (s) pieces of points apart is calculated. If the variance of the partial curvature $C_{i+s}$ with respect to the curvature $C_2$ of the entire point sequence is smaller than a predetermined value, it is decided that the point sequence is a part of a circular arc and accordingly detected as the circular arc.

The partial curvature $C_{i+s}$ of the circular arc formed by three points $P_i$, $P_{i+s}$, and $P_{i+2s}$ of the point sequence is expressed by the following equation (5):

$$C_{i+1} = \theta_{i+1}/d_{i+1} \quad (5)$$

where $\theta_{i+s}$ is the difference in the directional angle between a vector $[P_i\ P_{i+s}]$ and a vector $[P_{i+s}\ P_{i+2s}]$ and $d_{i+s}$ is the average of the length $P_i\ P_{i+s}$ and the length $P_{i+s}\ P_{i+2s}$.

The curvature $C_2$ of the entire point sequence is expressed by the following equation (6).

$$C_2 = \sum_{i=1}^{N-2S} C_{i+1}/(N-2S) \quad (6)$$

A decision is made according to the value of the variance of the partial curvature $C_{i+s}$ with respect to the curvature $C_2$ of the entire point sequence. If the value of the variance is smaller than a predetermined value, it is decided that the point sequence is a part of a circular arc and consequently is detected as the circular arc.

However, the above-described conventional method have the following disadvantages:

The disadvantage common to the examples 1 and 2 is that in the processes (A) and (B), in forming a point sequence from edge points extracted from the two-dimensional image, false edge points are generated as a result of, for example, dirt adhering to the product or part roughness of the product surface, and electric signal noise. Such false edge points do not coincide with the required true edge points of the actual configuration of the product or parts to be measured or inspected. If extraction of edge points is repeated to remove the false edge points, some of the true edge points will disappear together with the false edge points. As a result, the required edge points decrease and the point sequence becomes short. Consequently, it becomes difficult to make a correct approximation of the circular arc. In addition, edge points serving as the information source of the approximation of a circular arc decrease, and thus, the position and radius of the circular arc cannot be accurately calculated.

Further, it takes a long time for the methods of examples 1 and 2 to perform the necessary calculations because a large number of angle calculations is required.

As described previously, according to the example 1, the curvature $C_1$ of the entire point sequence is expressed by the equation (4). But supposing that $d_0$ is the length of the entire point sequence and $\theta_{01}$ is the variation from the directional angle of a vector $P_1 P_2$ connecting one edge point of the point sequence and a point adjacent thereto with each other to the directional angle of a vector $P_{N-1} P_N$ connecting the other edge point of the point sequence and a point adjacent thereto with each other, the curvature $C_1$ is expressed as follows:

$$C_1 = \sum_{i=1}^{N-2} C_{i+1}/(N-2) \frac{\theta_{01}}{d_0} \quad (7)$$

Usually the actual outline image of a product or part is not necessarily thin, but thick. According to the above-described method for extracting edge points which uses filtering, large errors are made in determining the coordinates of edge points. In addition, since the average value $d_{i+1}$ of the equation (3) is small, a large error is made in the directional angle, between the vector $P_1 P_2$ and the vector $P_{N-1} P_N$, which determines the variation $\theta_{01}$. Thus, a large error occurs in the calculation of the variation $\theta_{01}$, namely, in the calculation of the curvature $C_1$ of the entire point sequence.

According to the example 2, since the average value $d_{i+s}$ of the equation (5) is (s) times as great as the average value $d_{i+1}$ of the equation (3) of the example 1, errors in determining the coordinates of edge points are not large and consequently, the error of the curvature $C_2$ of the entire point sequence is smaller than that of the example 1. But if the number of point sequences is small, the curvature cannot be calculated depending on the value of (s). Further, according to the example 2, there is no reference value on which an appropriate value of (s) is determined.

Furthermore, according to the examples, the center of the circular arc is not found.

SUMMARY OF THE INVENTION

Accordingly, an essential object of the present invention is to provide a method for approximating a circular arc in the processing of a two-dimensional image without forming a point sequence based on edge points and any inappropriate influence caused by errors, and capable of performing an approximation with a high accuracy.

In accomplishing these and other objects, according to one aspect of the present invention, there is provided a method for approximating the center position and radius of a circular arc detected in the processing a two-dimensional image, comprising the steps of:

extracting an aggregation of edge points from data of the two-dimensional image of a product or part having the circular arc to be detected, a configuration of which is measured or inspected;

finding the square of the distance between the center of a circular arc and a given edge point of an aggregation of the edge points;

finding the square of the radius of the circular arc used in the first finding step;

finding the square of the difference between the two squares;

taking a mean value of a fourth power error obtained by the square of the difference of the two squares; and minimizing the mean value of the fourth power error to perform an approximation so as to estimate a circular arc having the minimum mean value as an approximated circular arc of the circular arc to be detected in the aggregation of the edge points..

According to the above construction, since it is unnecessary to perform processing for forming a point sequence based on edge points, a great number of edge points can be provided as the information source for approximating the center position and radius of a circular arc. In addition, even though errors occur in determining the coordinates of edge points, they do not cause calculations to be inappropriately performed. Further, it is unnecessary to perform angle calculations, the center and radius of the circular arc can be approximated with a high accuracy by easy calculations.

BRIEF DESCRIPTION OF THE DRAWINGS

These and other objects and features of the present invention will become clear from the following description taken in conjunction with the preferred embodiments thereof with reference to the accompanying drawings, in which:

FIG. 2 is an example of an output of a Laplacian filter to be used in the extraction of edge points in the embodiment of the present invention and the conventional method;

FIG. 3 is an illustration showing the conventional method of extracting edge points;

FIG. 4 is an illustration showing the conventional method of extracting edge points;

FIG. 5 is an illustration showing the conventional method of composing a point sequence;

DETAILED DESCRIPTION OF THE INVENTION

Figure 1:
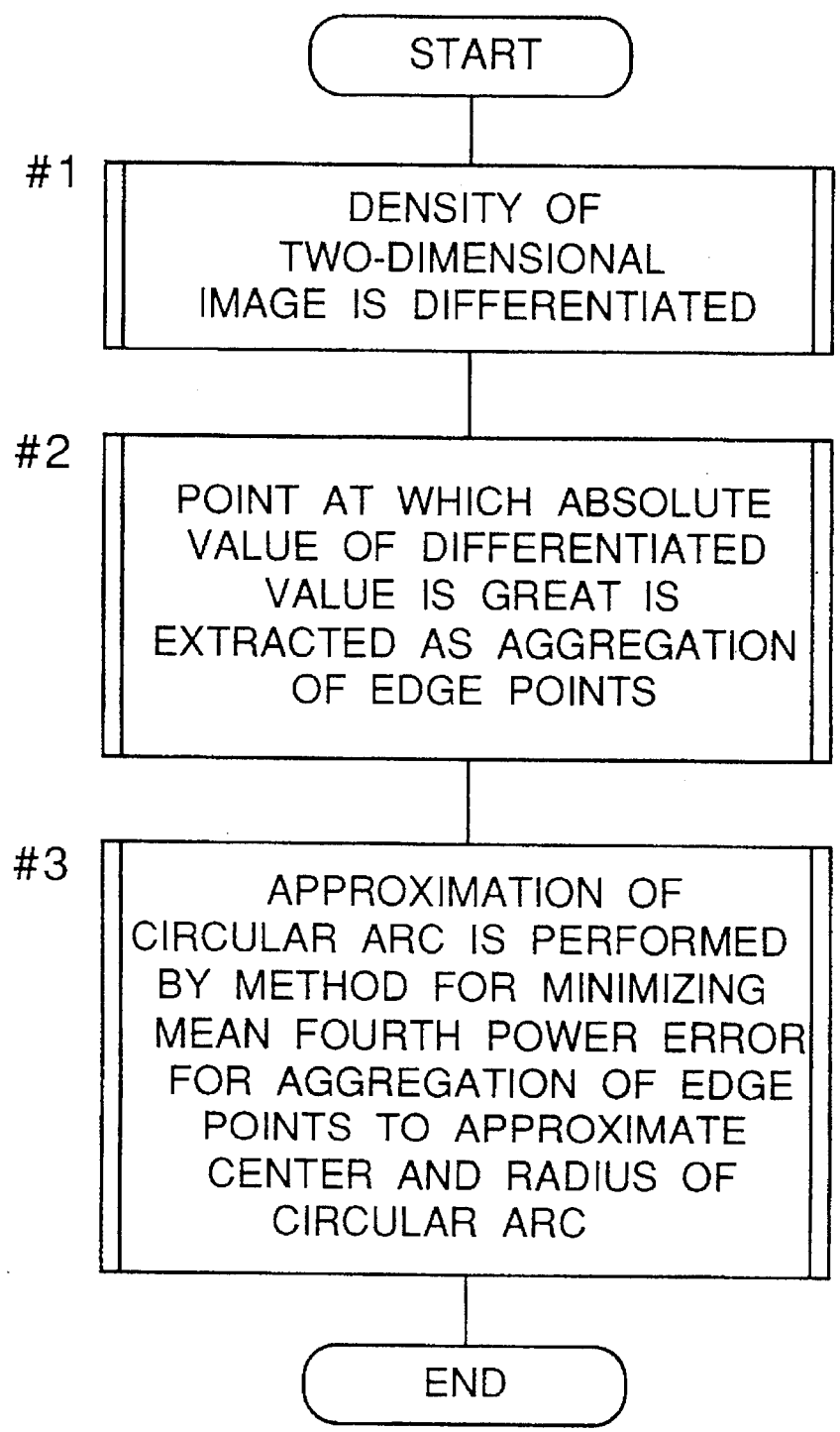
FIG. 1 is a flowchart according to an embodiment of the present invention.
Figure 6:
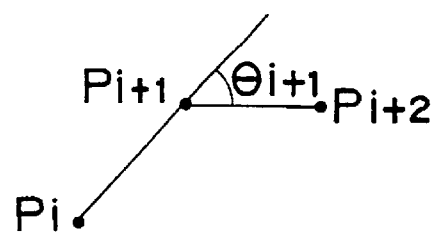
FIG. 6 is an illustration showing a first example of the conventional method for calculating a radius of curvature.
Figure 7:
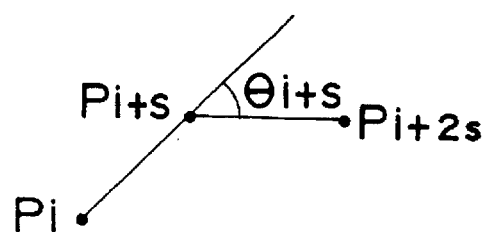
FIG. 7 is an illustration showing a second example of the conventional method for calculating a radius of curvature.

Before the description of the present invention proceeds, it is to be noted that like parts are designated by like reference numerals throughout the accompanying drawings.

Referring now to accompanied drawings, the method for approximating the center position and radius of a circular arc in the processing of a two-dimensional image according to an embodiment of the present invention will be described below.

FIG. 1 is a flowchart according to an embodiment of the present invention. In this embodiment, a circular arc configuration of a product or part is approximated using an apparatus including an image pick-up device, an image storing/processing device, and a calculating device.

Figure 2:
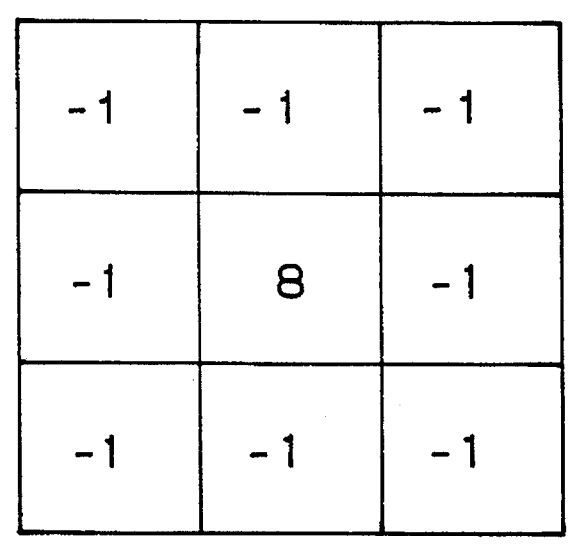

At step #1, the image of a product or part to be detected having a circular arc configuration is picked up and the density of a two-dimensional image is differentiated based on the data thereof. The image is filtered by a digital differential filter such as ! a Laplacian filter and consequently, the output distribution of the filtering as shown in FIG. 2 is obtained.

At step #2, the aggregation of edge points is extracted from the two-dimensional image.

At the edge point, an image density abruptly changes. The edge point corresponds to an outline at which the image brightness suddenly changes on the product or part to be measured or inspected. The absolute value of the differentiated value of an image density is great at the edge point. Therefore, in the output distribution in FIG. 2 obtained at step #1, points of a great absolute value are extracted as edge points and the aggregation of the edge points is obtained. Although this method generates a few false edge points due to, for example, dirt adhered to of the product or the part, roughness of the product surface, or electric signal noise, the number of required true edge points is high. Therefore, according to this method, inappropriate influence is hardly given in detecting the center position and radius of a circular arc.

At step #3, the center position and radius of a circular arc is approximated and detected by the present method for minimizing a mean fourth power error based on the aggregation of the edge points obtained at step #2.

This method is described below.

$$(x-a)^2 + (y-b)^2 = r^2 \quad (8)$$

The equation (8) indicates a circle having the radius (r) and the center at a point (a, b). The equation (8) can be expressed as follows:

$$x^2 - Ax + y^2 - By + C = 0 \quad (9)$$

The square of the distance between the center (a, b) of the circular arc to be detected and a given edge point $(x_i, y_i)$ is equal to the left side portion $\{(x-a)^2 + (y-b)^2\}$ of the equation (8).

Supposing that (r) is the radius between the edge point to be detected and the point (a, b), the following equation (10) is established:

$$(x_i - a)^2 + (y_i - b)^2 = r^2 + e_i \quad (10)$$

$(e_i)$ of the equation (10) is the difference between the square of the distance between the center (a, b) of the circular arc and the edge point $(x_i, y_i)$ and the square of the radius (r) of the circular arc. Thus, the equation (10) can be expressed as follows:

$$e_i = (x_i - a)^2 + (y_i - b)^2 - r^2 \quad (11)$$
$$= x_i^2 - Ax_i + y_i^2 - By_i + C$$

Finding the average value (E) of the sum of the square of the equation (11) with respect to (N) edge points, the following equation (12) is obtained:

$$E = \sum_{i=1}^{N} e_i^2 / N = \sum_{i=1}^{N} (x_i^2 - Ax_i + y_i^2 - By_i + C)^2 / N \quad (12)$$

The center (a, b) of the circular arc and the radius (r) thereof which are approximated by the equations (8) and (9) are obtained by (A), (B), and (C) which minimize the average value (E) of the equation (12). The equation (12) represents the method for minimizing the mean fourth power error according to the embodiment of the present invention.

Supposing that f $(x_i, y_i)$ is the differentiated value of the image density at the given edge point $(x_i, y_i)$, the equation (12) can be expressed as follows:

$$E = \sum_{i=1}^{N} f(x_i, y_i) \cdot (x_i^2 - Ax_i + y_i^2 - By + C)^2 / F \quad (13)$$

$$\text{where } F = \sum_{i=1}^{N} f(x_i, y_i)$$

The equation (13) may be used instead of the equation (12) by giving the differentiated value of the image density at each edge point as a load to the mean fourth power error at each edge point. In this case, the load may be expressed in the form of a given function of the differentiated value f $(x_i, y_i)$ of the image density, for example, a square root, a logarithmic function, and an exponential function. Since the change in an image brightness can be appropriately reflected in an approximative calculation, approximative calculations can be appropriately performed.

The method for finding (A), (B) and (C) which minimize the average value (E) of the equation (13) is described below. To this end, the equation (13) is partially differentiated by (A), (B) and (C). Then, the following simultaneous equation (14) is solved.

$$\left. \begin{array}{l} \partial E/\partial A = 0 \\ \partial E/\partial B = 0 \\ \partial E/\partial C = 0 \end{array} \right\} \quad (14)$$

The simultaneous equations of the equation (14) is solved as follows:

$$\frac{\partial E}{\partial A} = \quad (14\text{-}1)$$

$$\sum_{i=1}^{N} [f(x_i, y_i) \cdot (x_i^2 - Ax_i + y_i^2 - By_i + C) \cdot (-2x_i)]/F = 0$$

$$\frac{\partial E}{\partial B} = \quad (14\text{-}2)$$

$$\sum_{i=1}^{N} [f(x_i, y_i) \cdot (x_i^2 - Ax_i + y_i^2 - By_i + C) \cdot (-2y_i)]/F = 0$$

$$\frac{\partial E}{\partial C} = \sum_{i=1}^{N} [f(x_i, y_i) \cdot (x_i^2 - Ax_i + y_i^2 - By_i + C) \cdot 2]/F = 0 \quad (14\text{-}3)$$

Supposing $Z_i = x_i^2 + y_i^2$, these equations (14-1), (14-2), and (14-3) are expressed as follows:

From the equation (14-1), $$\sum_{i=1}^{N} [f(x_i, y_i) \cdot (Z_i \cdot x_i - Ax_i^2 - Bx_i \cdot y_i + Cx_i)] = 0 \quad (14\text{-}4)$$

From the equation (14-2), $$\sum_{i=1}^{N} [f(x_i,y_i) \cdot (Z_i \cdot y_i - A x_i \cdot y_i - B y_i^2 + C y_i)] = 0 \quad (14\text{-}5)$$

From the equation (14-3), $$\sum_{i=1}^{N} [f(x_i,y_i) \cdot (Z_i - A x_i - B y_i + C)] = 0 \quad (14\text{-}6)$$

Supposing $$\sum_{i=1}^{N} (f(x_i,y_i) \cdot \alpha_i) = \bar{\alpha}$$

and $\alpha$ is an any value such as x, y, $x^2$, or x·y, these equations are as follows:

From the equation (14-41), $$\overline{Z \cdot x} - A\overline{x^2} - B\overline{x \cdot y} + C\bar{x} = 0 \quad (14\text{-}4')$$

From the equation (14-5)

$$\overline{Z \cdot y} - A\overline{x \cdot y} - B\overline{y^2} + C\bar{y} = 0 \quad (14\text{-}5')$$

From the equation (14-6)

$$\text{ti } \bar{Z} - A\bar{x} - B\bar{y} + C = 0 + tm \quad (14\text{-}6')$$

Here, (the left side of the equation (14-4')) $-\bar{x} \times$ (the left side of the equation (14-6'))=0, $$\overline{Z \cdot x} - \bar{Z} \cdot \bar{x} - A(\overline{x^2} - \bar{x}^2) - B(\overline{x \cdot y} - \bar{x} \cdot \bar{y}) = 0 \quad (14\text{-}7)$$

Here, (the left side of the equation (14-5')) $-\bar{y} \times$ (the left side of the equation (14-6))=0, $$\overline{Z \cdot y} - \bar{Z} \cdot \bar{y} - A(\overline{x \cdot y} - \bar{x} \cdot \bar{y}) - B(\overline{y^2} - \bar{y}^2) = 0 \quad (14\text{-}8)$$

From the equation (22), $$\begin{aligned} V(x) &= \sum_i [f(x_i,y_i) \cdot (x_i^2 - 2x_i \cdot \bar{x} + \bar{x}^2)]/F \quad (14\text{-}9)\\ &= \overline{x^2} - 2\bar{x} \cdot \bar{x} + \bar{x}^2 \\ &= \overline{x^2} - \bar{x}^2 \end{aligned}$$

Similarly, from the equation (23), the following equation is obtained:

$$V(y) = \overline{y^2} - \bar{y}^2 \quad (14\text{-}10)$$

From the equation (24), $$\begin{aligned} C(x,y) &= \sum_i f(x_i,y_i) \cdot (x_i \cdot y_i - x_i \cdot \bar{y} - \bar{x} \cdot y_i + \bar{x} \cdot \bar{y})/F \quad (14\text{-}11)\\ &= \overline{x \cdot y} - \bar{x} \cdot \bar{y} - \bar{x} \cdot \bar{y} + \bar{x} \cdot \bar{y} \\ &= \overline{x \cdot y} - \bar{x} \cdot \bar{y} \end{aligned}$$

Similarly, from the equations (25) and (26), $$C(x,z) = \overline{x \cdot z} - \bar{x} \cdot \bar{z} \quad (14\text{-}12)$$

$$C(y,z) = \overline{y \cdot z} - \bar{y} \cdot \bar{z} \quad (14\text{-}13)$$

Substituting the equations (14-12), (14-9), and (14-11) in the equation (14-7), $$C(x,z) - A \cdot V(x) - B \cdot C(x,y) = 0 \quad (14\text{-}7')$$

Substituting the equations (14-13), (14-10), and (14-11) in the equation (14-8), $$C(y,z) - A \cdot C(x,y) - B \cdot V(y) = 0 \quad (14\text{-}8')$$

The simultaneous equations (14-7') and (14-8') are solved to obtain the equations (15) and (16).

$$A = \frac{C(x,z) \cdot V(y) - C(y,z) \cdot C(x,y)}{V(x) \cdot V(y) - C(x,y)^2} \quad (15)$$

$$B = \frac{C(y,z) \cdot V(x) - C(x,z) \cdot C(x,y)}{V(x) \cdot V(y) - C(x,y)^2} \quad (16)$$

The following equation (17) is obtained from the equation (14-6').

$$C = A \cdot \bar{x} + b \cdot \bar{y} - \bar{z} \quad (17)$$

where $$z = x^2 + y^2 \quad (18)$$

In the above equations, "V( )" indicates variance, "C( )" indicates covariance and upper bar affixed above x, y, and z indicates average.

$$\bar{x} = \sum_i f(x_i,y_i) \cdot x_i / N \quad (19)$$

$$\bar{y} = \sum_i f(x_i,y_i) \cdot y_i / N \quad (20)$$

$$\begin{aligned} \bar{z} &= \sum_i f(x_i,y_i) \cdot z_i / N \quad (21)\\ &= \sum_i f(x_i,y_i) \cdot (x_i^2 + y_i^2)/N \end{aligned}$$

$$V(x) = \sum_i f(x_i,y_i) \cdot (x_i - \bar{x})^2 / N \quad (22)$$

$$V(y) = \sum_i f(x_i,y_i) \cdot (y_i - \bar{y})^2 / N \quad (23)$$

$$C(x,y) = \sum_i f(x_i,y_i) \cdot (x_i - \bar{x}) \cdot (y_i - \bar{y})/N \quad (24)$$

$$C(x,z) = \sum_i f(x_i,y_i) \cdot (x_i - \bar{x}) \cdot (z_i - \bar{z})/N \quad (25)$$

$$C(y,z) = \sum_i f(x_i,y_i) \cdot (y_i - \bar{y}) \cdot (z_i - \bar{z})/N \quad (26)$$

The coorrdinate (a, b) of the center and the radius (r) of the circular arc to be detected are calculated as follows from (A), (B) and (C) and the equations (8) and (9):

$$a = A/2 \quad (27)$$
$$b = B/2 \quad (28)$$

$$r = \sqrt{A^2/4 + B^2/4 - C} \quad (29)$$

Thus, the center position and radius of the circular arc to be detected from the data of the two-dimensional image can be approximated.

It is decided based on the value of (E) of the equation (13) with respect to (a) of the equation (27), (b) of the equation (28), and (r) of the equation (29) whether or not the aggregation of the edge points forms a circular are.

That is, if the value of (E) is smaller than a predetermined value, it is decided that the aggregation of the edge points forms the circular arc. Thus, a circle of radius (r) with the point (a, b) at the center thereof is detected.

According to the above construction, since it is unnecessary to perform processing for forming a point sequence based on edge points, a great number of edge points can be provided as the information source for approximating the center position and radius of a circular arc. In addition, even though errors occur in determining the coordinates of edge points, they do not cause calculations to be inappropriately performed. Further, it is unnecessary to perform angle calculations, and the center and radius of the circular arc can be approximated with a high accuracy using simple easy calculations. Furthermore, since the differentiated value of the image density at each edge point is given as a load to the mean fourth power error at each edge point, the center position and radius of the circular arc can be accurately found.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A data processor implemented method for processing two-dimensional image data of an object to inspect a circular arc configuration of the object, the two-dimensional image data representative of a two-dimensional image containing an image of the circular arc configuration of the object, said method comprising:

subjecting the two-dimensional image data to a data extraction process to extract edge point image data from the two-dimensional image data, the edge point image data indicative of an aggregation of image edge points of the image of the circular arc configuration of the object; and, subjecting the edge point image data to a data approximation process to approximate the circular arc configuration of the object, said data approximation process including a first data processing step of determining the square of a distance between a center of a given circle having a given radius and each image edge point of the edge point image data, a second data processing step of determining the square of the radius of the given circle, a third data processing step of determining, for each image edge point of the edge point image data, the square of a difference between the square of the distance determined in said first data processing step and the square of the radius determined in said second data processing step, a fourth data processing step of determining a mean of the squares of the differences determined in said third data processing step, the mean of the squares of the differences corresponding to a mean fourth power error of the given circle relative to the aggregation of image edge points of the edge point image data, and a fifth data processing step of defining a circle to be applied as the given circle in said first through third data processing steps which minimizes the mean of the squares of the differences determined in said fourth data processing step, the thus defined circle approximating the circular arc configuration of the object.

2. A data processor implemented method as claimed in claim 1, wherein, in said fourth and fifth data processing steps of said data approximation process, a differentiated value of an image density of each image edge point is applied as a load to the mean fourth power error at each image edge point.

3. A data processor implemented method as claimed in claim 1, wherein, in said fourth and fifth data processing steps of said data approximation process, a given function of a differentiated value of an image density of each image edge point is applied as a load to the mean fourth power error at each image edge point.

4. A data processor implemented method for inspecting a circular arc configuration of an object, said method comprising:

viewing the circular arc configuration of the object with an image pick-up device to obtain a two-dimensional image of the circular arc configuration of the object;

producing two-dimensional image data of the two-dimensional image obtained in said viewing step, the two-dimensional image data representative of an image density of the two-dimensional image of the circular arc configuration of the object, subjecting the two-dimensional image data to a data extraction process to extract edge point image data from the two-dimensional image data, the edge point image data indicative of an aggregation of image edge points of the image of the circular arc configuration of the object; and, subjecting the edge point image data to a data approximation process to approximate the circular arc configuration of the object, said data approximation process including a first data processing step of determining the square of a distance between a center of a given circle having a given radius and each image edge point of the edge point image data, a second data processing step of determining the square of the radius of the given circle, a third data processing step of determining, for each image edge point of the edge point image data, the square of a difference between the square of the distance determined in said first data processing step and the square of the radius determined in said second data processing step, a fourth data processing step of determining a mean of the squares of the differences determined in said third data processing step, the mean of the squares of the differences corresponding to a mean fourth power error of the given circle relative to the aggregation of image edge points of the edge point image data, and a fifth data processing step of defining a circle to be applied as the given circle in said first through third data processing steps which minimizes the mean of the squares of the differences determined in said fourth data processing step, the thus defined circle approximating the circular arc configuration of the object.

5. A data processor implemented method as claimed in claim 4, wherein said extraction process includes applying the two-dimensional image data to a digital differential filter.

6. A data processor implemented method as claimed in claim 4, wherein said extraction process includes applying the two-dimensional image data to a Laplacian filter.

7. A data processor implemented method as claimed in claim 4, wherein, in said fourth and fifth data processing steps of said data approximation process, a differentiated value of the image density of each image edge point is applied as a load to the mean fourth power error at each image edge point.

8. A data processor implemented method as claimed in claim 4, wherein, in said fourth and fifth data processing steps of said data approximation process, a given function of a differentiated value of the image density of each image edge point is applied as a load to the mean fourth power error at each image edge point.

9. An apparatus for inspecting a circular arc configuration of an object, comprising:

an image pick-up device for viewing the circular configuration of the object to obtain a two-dimensional image of the circular arc configuration of the object, and for producing two-dimensional image data of the two-dimensional image, the two-dimensional image data representative of an image density of the two-dimensional image of the circular arc configuration of the object; and an image processing device for subjecting the two-dimensional image data produced by said image pick-up device to a data extraction process to extract edge point image data from the two-dimensional image data, the edge point image data indicative of an aggregation of image edge points of the image of the circular arc configuration of the object, and for subjecting the edge point image data to a data approximation process to approximate the circular arc configuration of the object, said data approximation process including a first data process of determining the square of a distance between a center of a given circle having a given radius and each image edge point of the edge point image data, a second data process of determining the square of the radius of the given circle, a third data process of determining, for each image edge point of the edge point image data, the square of a difference between the square of the distance determined in said first data process and the square of the radius determined in said second data process, a fourth data process of determining a mean of the squares of the differences determined in said third data process, the mean of the squares of the differences corresponding to a mean fourth power error of the given circle relative to the aggregation of image edge points of the edge point image data, and a fifth data process of defining a circle to be applied as the given circle in said first through third processor which minimizes the mean of the squares of the differences determined in said fourth data process, the thus defined circle approximating the circular arc configuration of the object.

10. An apparatus as claimed in claim 9, wherein said data processing device includes a digital differential filter for effecting said data extraction process.

11. An apparatus as claimed in claim 9, wherein said data processing device includes a Laplacian filter for effecting said data extraction process.

12. An apparatus as claimed in claim 9, wherein, in said fourth and fifth data processes of said data approximation process, a differentiated value of the image density of each image edge point is applied as a load to the mean fourth power error at each image edge point.

13. An apparatus as claimed in claim 9, wherein, in said fourth and fifth data processes of said data approximation process, a given function of a differentiated value of the image density of each image edge point is applied as a load to the mean fourth power error at each image edge point.

* * * * *